April 14, 1931. F. H. HEHEMANN 1,800,293
VALVE AND PROCESS OF MAKING SAME
Filed Oct. 8, 1927 2 Sheets-Sheet 1
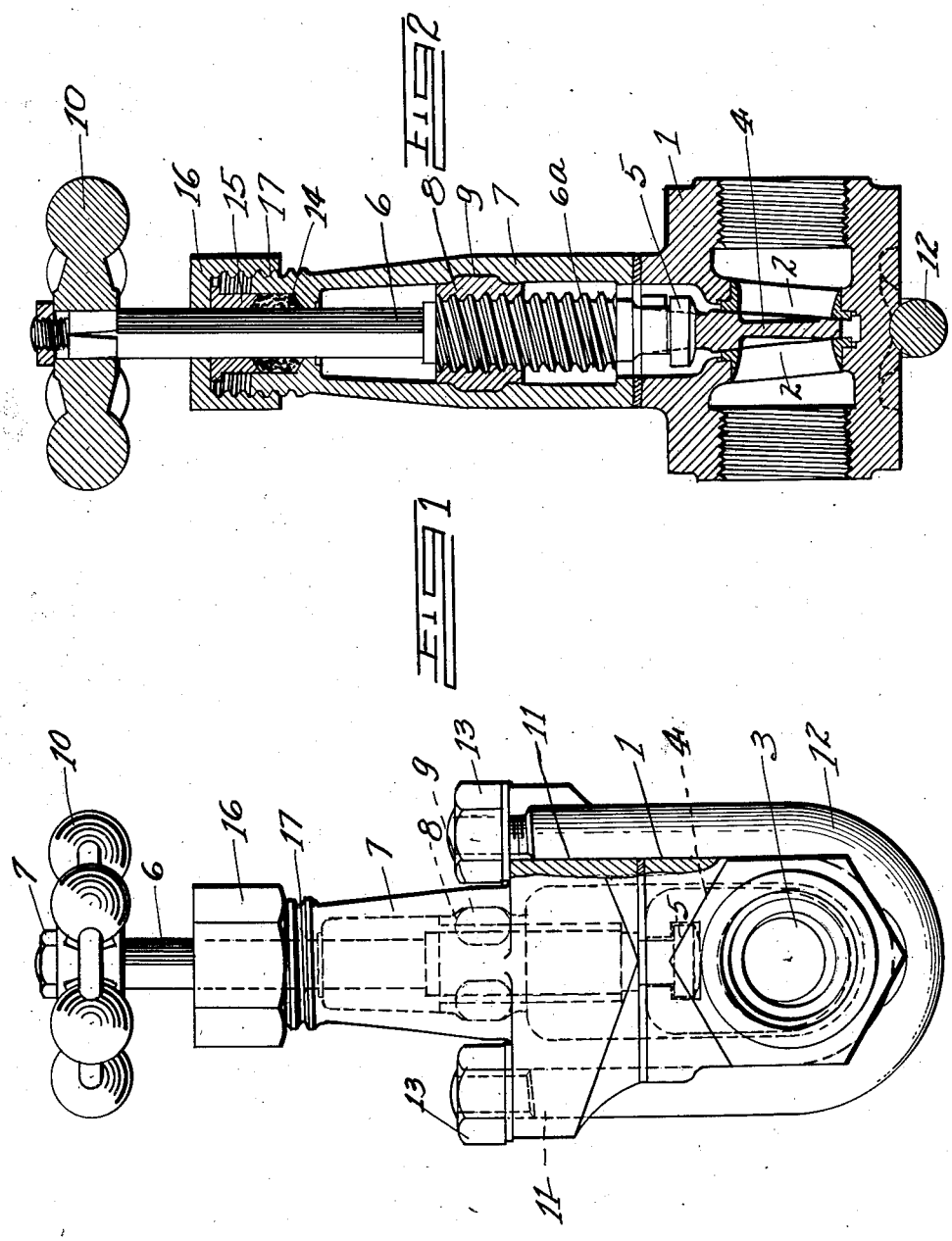
INVENTOR.
Frederick H. Hehemann
BY
ATTORNEYS

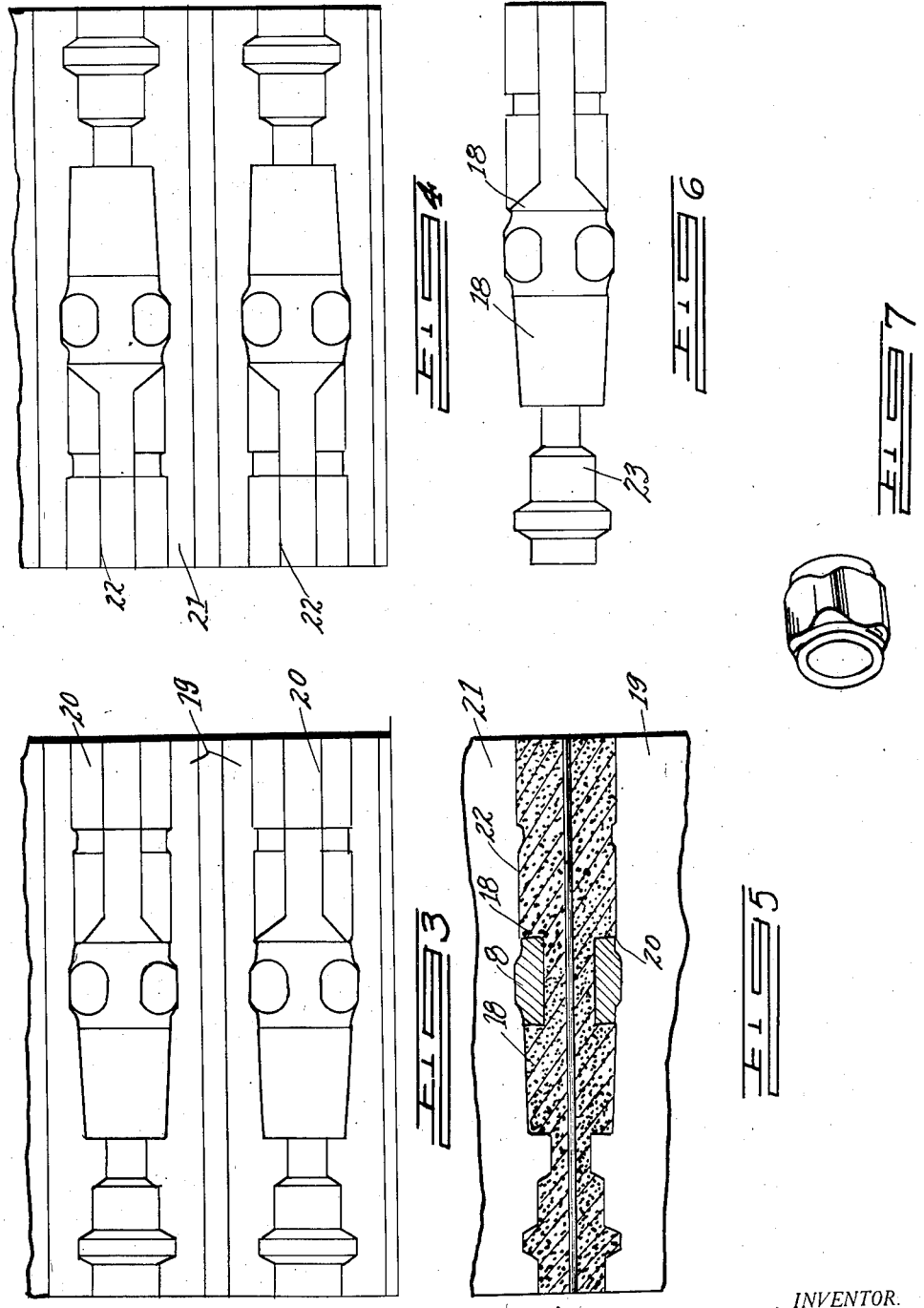

Patented Apr. 14, 1931

1,800,293

UNITED STATES PATENT OFFICE

FREDERICK H. HEHEMANN, OF CINCINNATI, OHIO, ASSIGNOR TO THE LUNKENHEIMER COMPANY, OF CINCINNATI, OHIO, A CORPORATION OF OHIO

VALVE AND PROCESS OF MAKING SAME

Application filed October 8, 1927. Serial No. 224,965.

My invention relates to the general class of valves, and particularly to iron body inside rising stem gate valves.

It is the object of my invention to provide an iron body valve which will have internally retained therein, a bushing of bronze or other non-corrodible metal which will be engaged by the threads of the stem. It is further my object to provide a valve in which a non-corrodible bushing is cast within the bonnet of the valve in immovable position. In connection with my improved valve, it is my object to provide improvements in the method of making the core for casting or molding the bonnet, so that the bushing may be held in a firmly retained position on the core prior to the molding operation.

In the art, to the best of my knowledge and belief, iron body inside screw rising stem gate valves have been made in the past with iron bonnets which are internally threaded to engage the threads of the valve stems. For certain classes of work, such constructions are satisfactory, but in the usual application of valves the materials handled are corrosive to iron, the internal threads in the bonnet become corroded, which results in early failure of the bonnet threads and rapid wear of the stem threads. All attempts to replace the iron threads which retain the threads of the valve stem with bronze bushings have resulted in so increasing the cost of manufacture that such attempts have been abandoned without resulting in the production of a marketable product.

It is an object of my invention to provide an inexpensive process for securing a non-corrodible stem bushing within an iron bonnet, which will permit the manufacture of an improved valve at substantially less cost than has heretofore been possible. The above and other objects to which reference will be made during the ensuing disclosure I accomplish by that certain arrangement and combination of parts of which I have disclosed a preferred embodiment both of the valve itself and of the method of making the core for casting the bonnet.

Referring to the drawings:—

Figure 1 is a side elevation partially in section, of a rising stem gate valve, in which my improvements are incorporated.

Figure 2 is a vertical section taken along the lines 2—2 in Figure 1.

Figure 3 is a plan view of the lower half of the core box.

Figure 4 is a plan view of the upper half of the core box.

Figure 5 shows a section of the core box with a core formed therein.

Figure 6 is a side elevation of a core, showing the preformation thereon of the bronze bushing which is to be cast within the bonnet to carry the valve stem threads.

Figure 7 is a perspective view of the preferred type of bushing which I employ.

Generally indicated at 1 I have shown the valve body within which are seated the valve seat rings 2 inclined at acute angles to the opening 3 through the valve so as to seat the valve disc 4. The valve disc has slanted faces which are adapted to engage the valve seat faces. The valve disc has a recessed upper portion which is coupled to the annular flange 5 of the valve stem 6. The valve stem is externally threaded as indicated at 6a. Within the bonnet 7 of the valve assembly I have shown the bushing 8 having squared edges 9 which prevent the bushing from turning, and moving in an endwise direction in the bonnet. The bushing is internally threaded, and the threads 6a of the stem engage the internal threads so that, with the rotation of the hand wheel 10, the valve disc is elevated from and lowered against the seats. There are spaces below and above the bushing, the lower space being necessary to accommodate the valve and the upper space being necessary to permit of threading the bushing without threading any part of the iron bonnet. If any threads are formed in the iron the effects of corrosion will be developed.

For retaining the bonnet on the valve body, I have shown a preferred construction in which the bonnet has slots 11 at its long ends, which fit the shanks of the U-shaped clip 12. The clip passes down under the valve body and is secured in position with the clip nuts 13. The stem of the valve is packed as indicated at 14 with a packing gland 15 holding the packing in place, and with a packing nut 16 engaging the exterior threads 17 of the valve bonnet.

In my efforts to discover some method of securing a stem bushing of bronze or other metal having similar properties within the bonnet, I have found that all ordinary methods of core making in which the core sand is packed in around a bushing do not give the most satisfactory production of the core for the bonnet. It is practically essential for a successful device that the bonnet will have the bushing securely retained therein so that the bushing cannot rotate or move in an endwise direction with the turning of the stem when opening or closing the valve. The problem of inserting the bushing into a core box and then filling in the core box with sand could not be satisfactorily done with packing instruments because the sand would not properly fill in the hole through the bronze bushing resulting in a weak construction at this point. By using air pressure to blow the sand into the core box, however, I have found that I am able to make a well formed and substantial core which can be subsequently used in the mold, and which will result in practically a perfect job of molding.

I have shown a section of a core box such as I prefer to employ for making the core. Figures 3 and 4 show the two halves of the box. The lower portion 19 of the core box has the core pattern 20 therein, and the upper portion 21 has the complementary portion 22 of the core pattern. The bushing 8 is first inserted in the core box, and sand under considerable pressure is blown in around and through the hole in the bushing. The core is then baked, and a dry sand core such as I have indicated at 23 results in which the bushing is firmly seated on the neck of the core. The core is then used for molding, and as noted, the bonnet is made with the bushing firmly held within the passage through the bonnet.

It will further be noted that the bonnet has slots at the long ends for seating the shanks of the clip bolt. In former practice valves of this type have had holes for the clip bolt and said holes were produced with baked cores. In my improved design I find that I can part the patterns on the minor axis and that I am thus enabled to accommodate an increased number of patterns in the mold without increasing the size of the mold, and that the slotted ends for the clip bolt can be produced in the mold in green sand by means of the pattern without the use of baked cores. I provide in the bonnet with the U-shaped slots for the clip bolt, as strong a structure as has heretofore been provided, with a considerable reduction in the cost of manufacture. In addition to great saving in casting, the slotted bonnet is very effective in use, since in mounting and dismounting the bonnet there will be no danger of stripping the threads of the U-bolt, which is always likely to happen in the old style bonnet.

Having thus described my invention, what I claim as new and desire to secure by Letters Patent, is:—

1. An iron body inside screw rising stem gate valve having an internally threaded relatively non-corrodible bushing molded within the bonnet thereof, said bushing being provided with means for preventing the rotary and endwise displacement thereof within the bonnet and said bonnet having spaces above and below the bushing, for the purpose described.

2. An iron bonnet for an inside screw rising stem gate valve having a hollow body, a bushing of bronze cast within and spaced from the ends of said hollow body, said bushing extending out of round within the hollow body to prevent the rotation and endwise movement of the bushing within the hollow body.

3. An iron bonnet for an inside screw rising stem gate valve having a hollow body, a bushing of relatively non-corrodible metal, said bushing cast within and spaced from the ends of said hollow body, the hollow body having a flanged portion with slots at the ends thereof for seating a U-bolt for securing the hollow body and valve body together, whereby the entire device may be cast with a minimum of cores, and in a pattern divided on the minor axis thereof.

4. In a valve, a casing having a passageway and a valve member therein, a bonnet, a threaded stem therein spaced therefrom carrying said valve member, an internally threaded insert in said bonnet spaced from the ends thereof and non-rotatably mounted therein adapted to support said stem in spaced relationship from the walls of the bonnet thereby forming upper and lower chambers on either side of said insert in the bonnet, the walls of which are spaced from said stem and means whereby said lower chamber is completely closed at the bottom thereof from the passageway in the casing when the valve is closed whereby no accumulation can take place in said lower chamber when the valve is closed.

5. In a valve, a bonnet, a threaded stem therein spaced therefrom, an internally threaded insert in said bonnet spaced from the ends thereof and non-rotatably mounted therein adapted to support said stem in spaced relationship from the walls of the bonnet thereby forming chambers on either side of said insert in the bonnet, the walls of which are spaced from said stem, one of the chambers in said bonnet above the insert having means sealing its upper end and engaging with said stem and the other of said chambers below the insert communicating with a line passageway in said valve only when the valve is open whereby when the valve is closed no accumulation can take place in the lower chamber.

6. In a valve, a bonnet, a threaded stem therein spaced therefrom, an internally threaded insert in said bonnet spaced from the ends thereof and non-rotatably mounted therein adapted to support said stem in spaced relationship from the walls of the bonnet thereby forming chambers on either side of said insert in the bonnet, the walls of which are spaced from said stem, one of the chambers in said bonnet above the insert having means sealing its upper end and engaging with said stem and the other of said chambers below the insert communicating with a line passageway in said valve only when the valve is open whereby when the valve is closed no accumulation can take place in the lower chamber, said bonnet comprising a one piece casting in which said insert is integrally cast.

7. In a bonnet valve, a detachable bonnet, an internally threaded insert mounted therein spaced from the ends of the bonnet and forming an upper and a lower chamber, the thread of said insert being spaced inwardly from the bonnet walls, a stem mounted in said insert spaced from said bonnet walls, a valve casing supporting said bonnet and having a passageway therein, and a valve member operable by said stem to close said passageway and lower chamber whereby no accumulation can take place in the chamber when the valve is closed.

8. In a bonnet valve, a detachable bonnet, an internally threaded insert mounted therein and partly embedded in the bonnet material and spaced from the ends of the bonnet, the threads of said insert being spaced inwardly from the bonnet walls, a stem mounted in said insert spaced from said bonnet walls, a valve casing supporting said bonnet, a valve member operable by said stem and means for attaching said bonnet on said casing.

9. In a bonnet valve, a detachable bonnet, an internally threaded insert mounted therein and partly embedded in the bonnet material and spaced from the ends of the bonnet, the threads of said insert being spaced inwardly from the bonnet walls, a stem mounted in said insert spaced from said bonnet walls, a valve casing supporting said bonnet, a valve member operable by said stem and means encircling the outside of said casing detachably attaching said bonnet on said casing, said means comprising a U-shaped clip and spaced ears on said bonnet for receiving the ends of said clip and supporting attaching nuts on the clip ends.

10. In combination in a bonnet valve, a valve casing having a passageway, a valve member, a bonnet, an integrally cast non-rotatably internally threaded member therein forming chambers, the threads of said member being spaced inwardly from the bonnet wall and said member forming a partition between the chambers above and below it in said bonnet, a valve stem mounted in said internally threaded member, threads therein carrying said valve stem, said valve being adapted to close the passageway in the lower chamber.

11. In combination in a bonnet valve, a valve casing, a valve member, a bonnet, an integrally cast non-rotatably internally threaded member therein, the threads of said member being spaced inwardly from the bonnet wall and said member forming a partition between the chambers above and below it in said bonnet, a valve stem mounted in said internally threaded member, the threads therein carrying said valve stem and a packing member forming a closure in the top of said bonnet engaging said valve stem.

12. In a bonnet valve, a valve casing of corrosive material, an integral bonnet of corrodible material, an integrally cast non-corrodible internally threaded insert spaced between the top and bottom of said bonnet the threads of said insert being spaced inwardly from the wall of said bonnet whereby chambers are formed in the space above and below said insert, a stem threaded in insert of non-corrosive material and a valve.

13. In a bonnet valve, a valve casing of corrosive material, an integral bonnet of corrodible material, an integrally cast non-corrodible internally threaded insert spaced between the top and bottom of said bonnet, the threads of said insert being spaced inwardly from the wall of said bonnet whereby chambers are formed in the space above and below said insert, a stem threaded in the insert of non-corrodible material, a valve, said valve member being of non-corrodible material and a non-corrodible valve seat in said valve casing for said valve member.

14. In a bonnet valve, a valve casing of corrodible material, an integral bonnet of corrodible material, an integrally cast non-corrodible internally threaded insert spaced between the top and bottom of said bonnet, the threads of said insert being spaced inwardly from the wall of said bonnet whereby chambers are formed in the space above and below said insert, a stem threaded in the insert of non-corrodible material, a valve, said valve member being of non-corrodible material and a non-corrodible valve seat in said valve casing for said valve member, said valve member having a wedge shaped cross section and said valve member seats being spaced to form a wedge shaped receptacle for the member.

15. In a bonnet valve, a casing having a line passageway therethrough and a valve receiving aperture in the top thereof, an integral bonnet having a lower chamber communicating with said valve receiving aperture and an upper chamber, said chambers being separated by an integrally cast insert non-rotatably mounted in said bonnet and having internal threads spaced from the walls of said bonnet inwardly thereof, and a valve steam threaded therein extending through said bonnet having a valve member at one end and means to actuate said valve stem at the other.

16. In a bonnet valve, a casing having a line passageway therethrough and a valve receiving aperture in the top thereof, an integral bonnet having a lower chamber communicating with said valve receiving aperture and an upper chamber, said chamber being separated by an integrally cast insert non-rotatably mounted in said bonnet and having internal threads spaced from the walls of said bonnet inwardly thereof, and a valve stem threaded therein extending through said bonnet having a valve member at one end and means to actuate said valve stem at the other, said insert and valve stem being formed of non-corrodible material.

17. In a bonnet valve, a casing having a line passageway therethrough and a valve receiving aperture in the top thereof, an integral bonnet having a lower chamber communicating with said valve receiving aperture and an upper chamber, said chamber being separated by an integrally cast insert non-rotatably mounted in said bonnet and having internal threads spaced from the walls of said bonnet inwardly thereof, and a valve stem threaded therein extending through said bonnet having a valve member at one end and means to actuate said valve stem at the other, said casing and bonnet being formed of corrodible material and said valve member, stem and insert being formed of non-corrodible material.

FREDERICK H. HEHEMANN.

DISCLAIMER 1,800,293.—*Frederick H. Hehemann*, Cincinnati, Ohio.
  VALVE AND PROCESS OF MAKING SAME. Patent dated April 14, 1931. Disclaimer filed June 22, 1931, by the assignee, *The Lunkenheimer Company*.

Hereby enters a disclaimer restricting claims 1, 2, 4, 5, 6, 7, 8, 10, 11, 12, 13, 14, 15, 16 and 17 as follows:

By restricting the element "bonnet" of said claim 1 to "a bonnet having attaching means thereon extending laterally therefrom and extending vertically on the bonnet from adjacent the bushing in the bonnet to the bottom of the bonnet on either side of the space within the bonnet below the bushing";

By restricting the element "hollow body" of said claim 2 to "a hollow body having attaching means thereon extending laterally therefrom and extending vertically on the hollow body from adjacent the bushing in the hollow body to the bottom of the hollow body on either side of the hollow body below the bushing";

By restricting the element "bonnet" of said claim 4 to "a bonnet having attaching means thereon extending laterally therefrom and extending vertically on the bonnet from adjacent the bushing in the bonnet to the bottom of the bonnet on either side of the chamber in the bonnet below the bushing";

By restricting the element "bonnet" of said claim 5 to "a bonnet having attaching means thereon extending laterally therefrom and extending vertically on the bonnet from adjacent the bushing in the bonnet to the bottom of the bonnet on either side of the chamber in the bonnet below the bushing";

By restricting the element "bonnet" of said claim 6 to "a bonnet having attaching means thereon extending laterally therefrom and extending vertically on the bonnet from adjacent the bushing in the bonnet to the bottom of the bonnet on either side of the chamber in the bonnet below the bushing";

By restricting the element "bonnet" of said claim 7 to "a bonnet having attaching means thereon extending laterally therefrom and extending vertically on the bonnet from adjacent the bushing in the bonnet to the bottom of the bonnet on either side of the chamber in the bonnet below the bushing";

By restricting the element "bonnet" of said claim 8 to "a bonnet having attaching means thereon extending laterally therefrom and extending vertically on the bonnet from adjacent the bushing in the bonnet to the bottom of the bonnet on either side of the chamber in the bonnet below the bushing";

By restricting the element "bonnet" of said claim 10 to "a bonnet having attaching means thereon extending laterally therefrom and extending vertically on the bonnet from adjacent the bushing in the bonnet to the bottom of the bonnet on either side of the chamber in the bonnet below the bushing";

By restricting the element "bonnet" of said claim 11 to "a bonnet having attaching means thereon extending laterally therefrom and extending vertically on the bonnet from adjacent the bushing in the bonnet to the bottom of the bonnet on either side of the chamber in the bonnet below the bushing";

By restricting the element "bonnet" of said claim 12 to "a bonnet having attaching means thereon extending laterally therefrom and extending vertically on the bonnet from adjacent the bushing in the bonnet to the bottom of the bonnet on either side of the chamber in the bonnet below the bushing";

By restricting the element "bonnet" of said claim 13 to "a bonnet having attaching means thereon extending laterally therefrom and extending vertically on the bonnet from adjacent the bushing in the bonnet to the bottom of the bonnet on either side of the chamber in the bonnet below the bushing";

By restricting the element "bonnet" of said claim 14 to "a bonnet having attaching means thereon extending laterally therefrom and extending vertically on the bonnet from adjacent the bushing in the bonnet to the bottom of the bonnet on either side of the chamber in the bonnet below the bushing";

By restricting the element "bonnet" of said claim 15 to "a bonnet having attaching means thereon extending laterally therefrom and extending vertically on the bonnet from adjacent the bushing in the bonnet to the bottom of the bonnet on either side of the chamber in the bonnet below the bushing";

By restricting the element "bonnet" of said claim 16 to "a bonnet having attaching means thereon extending laterally therefrom and extending vertically on the bonnet from adjacent the bushing in the bonnet to the bottom of the bonnet on either side of the chamber in the bonnet below the bushing";

By restricting the element "bonnet" of said claim 17 to "a bonnet having attaching means thereon extending laterally therefrom and extending vertically on the bonnet from adjacent the bushing in the bonnet to the bottom of the bonnet on either side of the chamber in the bonnet below the bushing."

[*Official Gazette July 7, 1931.*]